Oct. 25, 1966   F. D. RYAN   3,280,481
STUDENT WORKBOOK HAVING ONE OR MORE PAGES COMPRISING
SEPARABLY JOINED CARDS
Filed May 13, 1964
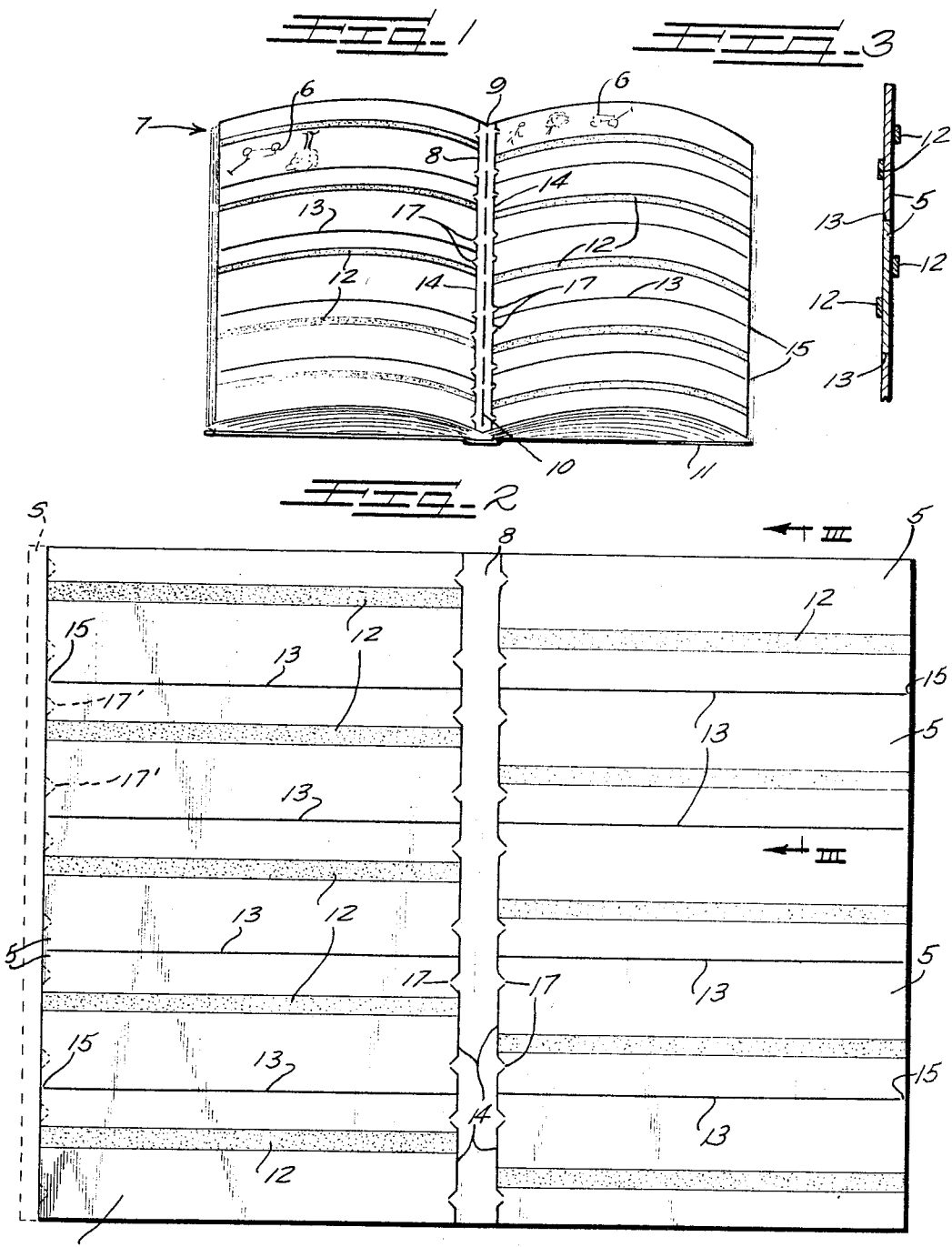
INVENTOR.
Frank D. Ryan
BY Barry L. Clark
John E. Peele Jr. ATTORNEYS

United States Patent Office 3,280,481
Patented Oct. 25, 1966

3,280,481
STUDENT WORKBOOK HAVING ONE OR MORE PAGES COMPRISING SEPARABLY JOINED CARDS
Frank D. Ryan, Wilmette, Ill., assignor to Bell & Howell Company, Chicago, Ill., a corporation of Illinois
Filed May 13, 1964, Ser. No. 367,109
4 Claims. (Cl. 35—35)

This invention relates to improvements in student workbooks and more particularly concerns a new and improved construction of such workbooks wherein one or more pages comprise separably joined cards which are adapted to be selectively separated for use apart from the book.

Students and teachers, especially at the grade school level, have become habituated to use of workbooks for various subjects. However, in sound reproducing educational machines, such as exemplified in Patents Nos. 2,603,006 and 2,677,200, individual cards must be fed into the machine for orienting a magnetic carrier with a magnetic pick-up head forming part of the sound reproducing apparatus of the machine. It is to the satisfaction of these two areas of utility that the present invention is directed.

An important object of the present invention is to provide in workbook page form a plurality of integrally connected cards which are adapted to be individually separated for use apart from the page as, for example, in an educational machine.

Another object of the invention is to provide in workbook page form a plurality of integrally connected and individually separable educational cards having thereon electromagnetic sound tracks.

A further object of the invention is to provide a student workbook having foldable pages comprised of individually separable but integrally connected cards having thereon magnetic sound tracks and in which the sound tracks are so relatively oriented on the opposing pages as to avoid deorientation of the magnetic particles thereof.

Still another object of the invention is to provide new and improved means for individually separably integrally connecting a plurality of cards in a page such as may be adapted for inclusion in a student's workbook and the like.

Other objects, features and advantages of the present invention will be readily apparent from the following detailed description of a preferred embodiment thereof taken in conjunction with the accompanying drawing, in which:

FIGURE 1 is an isometric view of a student workbook embodying features of the invention;

FIGURE 2 is an enlarged plan view of a double page spread of separably attached cards for the workbook; and FIGURE 3 is a fragmentary sectional detail view taken substantially on the line III—III of FIGURE 2.

Individually separable cards 5 are integrally connected in page form which may comprise individual leaves to be carried in a looseleaf or pocket folder, and the like, for convenient storage and handling, but in a desirable form are adapted to be bound together in multiple page fashion in a student workbook 7. Desirably, the cards are connected together in double page arrangement with a binding strip 8 centrally dividing the two pages. This median binding strip is adapted to have a longitudinal center crease 9 along which it is attached by suitable fastening means such as stitching, staples, and the like 10 or by means of adhesive, according to preferred book finding practice. A set of covers 11 is adapted to be provided for the book. If preferred, of course, each page of the cards 5 may be provided independently with an individual backing strip 8, instead of in the two page spread disclosed in FIGURE 2.

To adapt the cards 5 for use in an educational machine of the magnetic sound reproducing type as exemplified by the aforesaid patents, each of the cards is provided on at least one face with a longitudinally extending sound track in the form of a stripe of suitable width comprising a magnetic pigment of the type comprising ferric oxide in a binder. In a panel area of the card is suitable imprinted legend indicia 6 affording visual representation of the reproducible phonetic or explanatory record on the associated magnetic sound track stripe 12. For example, for a speaking dictionary of pronunciations, various words and word symbols and syllable separation and enunciation markings may be in the printed indicia. For language learning and pronunciation picture symbols, words and the like may be in the indicia.

In order to avoid the use of insulating separators between the opposed magnetic sound track stripe carrying faces of the unitized card sheets or leaves folded onto one another, the magnetic sound track stripes 12 are disposed on the opposing faces to be out of registration when the faces are in contact. For this purpose, the stripes 12 on the respectively opposing cards 5 are relatively offset. As shown, the stripes 12 on the cards 5 on the face of one of the sheets are located adjacent to one of the edges defining such cards while the stripes 12 on the cards of the opposite sheet are located adjacent to the opposite respective edges of those cards. As a result, when the opposing faces of the sheets are folded against one another, the magnetic stripes 12 all oppose unmagnetized areas of the opposing cards which are, in this instance, except for the magnetic stripes 12 made from non-magnetic material. This avoids degrading the respective stripes 12, as is liable to occur where sound has been recorded on the magnetic medium stripes 12 and such stripes are brought into opposing contiguity. In other words, by avoiding any direct face-to-face contact of the opposing stripes on the cards, de-orientation of the magnetic particles is prevented.

As best shown in FIGURE 3, where the cards 5 are equipped on both faces thereof with the magnetic medium sound track stripes 12, the opposite stripes are desirably relatively offset in the same manner as the stripes on opposing faces of foldably related sheets or leaves or pages, whereby to avoid face-to-face opposition and thus afford a relatively offset relationship of respective similar leaves in respect to both faces of the individual leaves.

For use in sound producing apparatus of the type referred to in the before mentioned patents, the record cards must have as nearly as practicable straight edges to run along the guide rails or surfaces of the sound reproducing machine and through or past the sound head thereof. One of the longitudinal edges serves this purpose, and more particularly the longitudinal edge which is nearest the magnetic sound record track stripe 12. Therefore, such edge must be cut clean in making the cards from suitable sheet material such as paper, or the like. Yet, to produce the cards 5 in the unitized leaf form, connections are required for mutually retaining and sustaining the cards in the unit until separated. According to the present invention, this is accomplished in a manner which assures positive retention of the respective cards in place in the sheet before separation, but enables individual separation of any selected card from the sheet, and assures a smooth, straight guide-riding edge on the card throughout at least the critical portion of the length of the card. In a desirable arrangement, the individual record cards 5 are separated by longitudinal straight cuts 13 entirely through the card material and extending from adjacent to the free side edge of the sheet to and freely entering inner end cuts 14 separating the inner ends of the cards from the binding strip 8. Between the outer edge of the sheet and the adjacent ends of card-separating cuts 13 are provided narrow uncut respective integral connecting area portions 15. Similarly, uncut narrow integral connecting area portions 17 interrupt the inner end severance line 14 at least once for each of the card sections 5. For stability, a plurality, herein shown as two, of the unsevered connecting areas 17 is provided for each card and located adjacent to each opposite longitudinal cut edge of the card. By having the unsevered connector areas 17 at inturned notchout extensions of the interrupted line of severance 14, interrupted die cutting of such line of severance is facilitated. It will thus be apparent that each card section 5 is connected to each adjacent card in the sheet but can be readily separated individually by breaking the narrow connectors 15 and 17.

Since in the sound reproducing machine the cards are fed from right to left, it will be observed that the longitudinal running or guide edges of the cards 5 are entirely smoothly straight from their left ends to the break-away areas or points where they have been separated by breaking of the end connectors 15 at the extreme right or trailing ends of such edges and where the extremely slight break-away roughness, if any, will be immaterial and not affect efficient reproducing coaction of the cards with the reproducing machine. If it is desired to eliminate even such slight lack of perfect smoothness, a narrow tear strip S may be provided along the outer edge of the sheet, as indicated at S in FIGURE 2 and comprising substantially a duplication of the inner binding edge strip 8 from which the cards are separable by breaking the narrow connector areas 17. Such outer edge tear strip, in such instance would be provided with one or more narrow connectors 17' in the otherwise complete severance line between the tear strips S and the outer ends of the respective cards. Thereby, the entire longitudinal edges of the cards would be perfectly straight and smooth. In a practical form, a student workbook 7 may have the pages of cards of a face dimension of about 5½ x 8½ inches. The respective break-away connector areas 15 and 17 are desirably as small as practicable for the particular material from which the cards are made, such as on the order of 1/16 of an inch intervening between the adjacent cut edges in a page size as indicated.

For use in a teaching course, the book 7 will be provided with an adequate number of pages of the cards 5 to cover any predetermined area and sequence of a particular academic subject. As the teaching course progresses, the student separates the cards 5 individually and in any preferred order from the respective pages, as instructed or desired and the separated card is used in the reproducing machine. Then, the used card may either be thrown away or may be easily filed by the student for future reference or review. Insofar as the unseparated cards in the book are concerned, they are positively maintained in proper order by reason of their integral connections in their respective pages until separated for use. The workbook 7 implements the general convenient pedagogical practice of using workbooks for various subjects to be learned.

It will be understood that modifications and variations may be effected without departing from the scope of the novel concepts of the present invention.

I claim as my invention:

1. A two-page spread sheet of teaching cards comprising aligned sets of cards entirely separated from one another except at small integral break-away connecting areas, a vertical connector strip separating the cards of the respective pages and being foldable along a vertical line for folding of the pages of the sheet, and horizontally extending magnetic recording track stripes on the foldably opposing faces of the cards, said stripes being relatively offset on said opposing faces so as to avoid contact with one another whereby to avoid deterioration of recordings on the track stripes when said faces are folded together.

2. A student workbook including a cover and at least two foldably related opposing pages, each of said pages being sub-divided horizontally into a plurality of separable cards which are adapted to be guided by and fed through a magnetic reproducing device from a first end of said card to a second end of said card;

a magnetic sound track record stripe on at least one side of each of said cards positioned parallel to, and at a predetermined distance from, the closest adjacent horizontal edge of said card, said horizontal edge being smooth and completely separated from an adjacent card for its entire length from said first end to a point closely adjacent said second end, first and second break-away connector means on said cards for holding said cards in said workbook in the form of a page, said first break-away connector means comprising a plurality of spaced, integral connecting areas on the vertical edge of said first ends of said cards, said second break-away connector means comprising an integral connecting area on the adjacent horizontal edges of a pair of adjoining cards at the second end of said cards, whereby said cards will be integrally held together in the form of a workbook page until a student desires to remove them for use, and wherein the positioning of said second break-away connector means at the second end of said card insures that any irregularity in said horizontal edge caused by breaking away said connector means will not interfere with the quality of sound reproduced from at least the major portion of said sound track record stripe when said horizontal edge is guided through a sound reproducing apparatus.

3. The student workbook of claim 2 wherein magnetic sound track record stripes are positioned on both sides of said cards, said stripes on the cards on one page of said book being located in offset relation relative to the stripes on the cards on the facing page of said book so that when said pages are folded into contacting relation, the sound recorded on the stripes will not be degraded.

4. The student workbook of claim 3 wherein only two sound track record stripes are positioned on each of said cards, one of said stripes being positioned on the lower half of one side of said card while the other stripe is positioned on the other side of the card and in the opposite half of the card, whereby, when a plurality of cards having their horizontal edges in line are arranged to form facing pages the sound track record stripes on the cards on one page will not engage the sound track record stripes of the cards on the facing page when the pages are folded together.

References Cited by the Examiner

UNITED STATES PATENTS

| | | | |
|---|---|---|---|
| 773,594 | 11/1904 | Robinson | 281—16 |
| 2,436,888 | 3/1948 | Hess et al. | 281—16 |
| 2,677,200 | 5/1954 | MacChesney | 35—35.3 |
| 2,700,556 | 1/1955 | Holmwood | 282—11.5 X |

EUGENE R. CAPOZIO, *Primary Examiner.*

JEROME SCHNALL, *Examiner.*

W. GRIEB, *Assistant Examiner.*